Patented Feb. 25, 1947

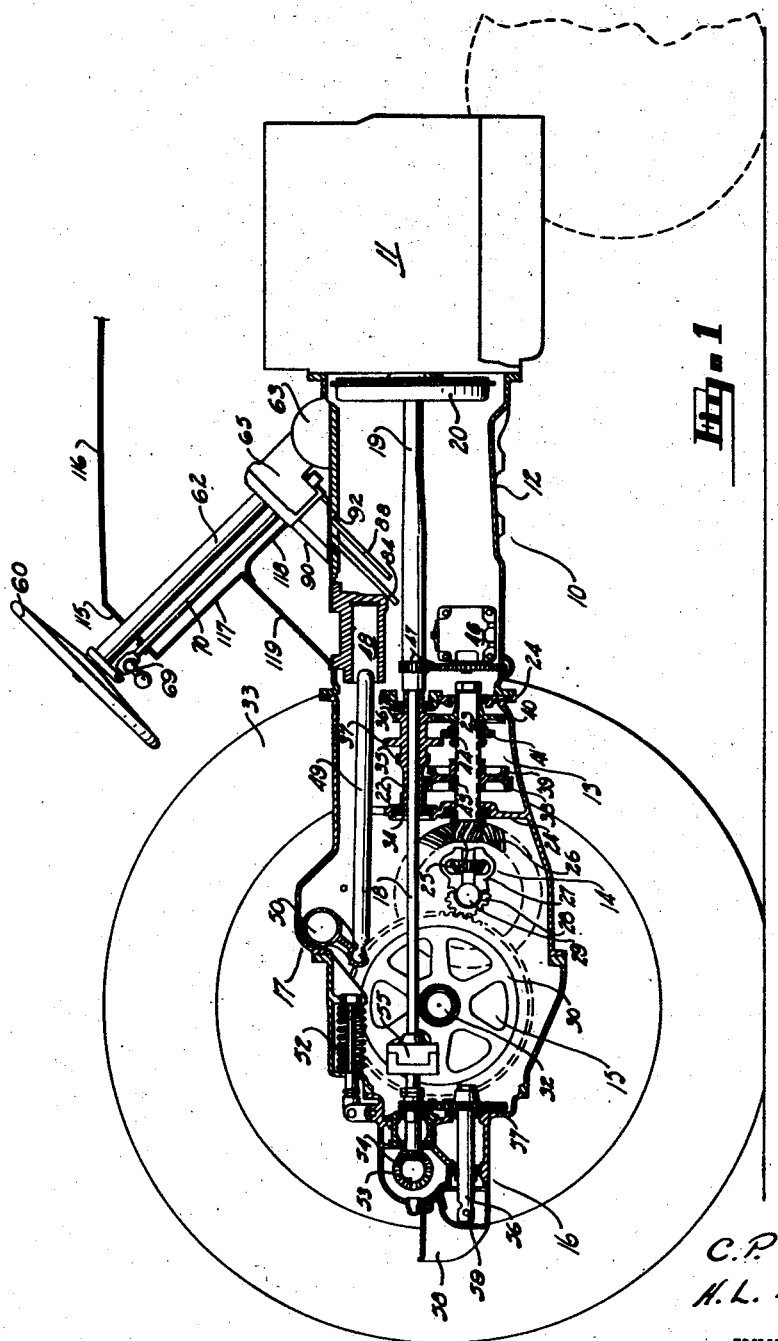

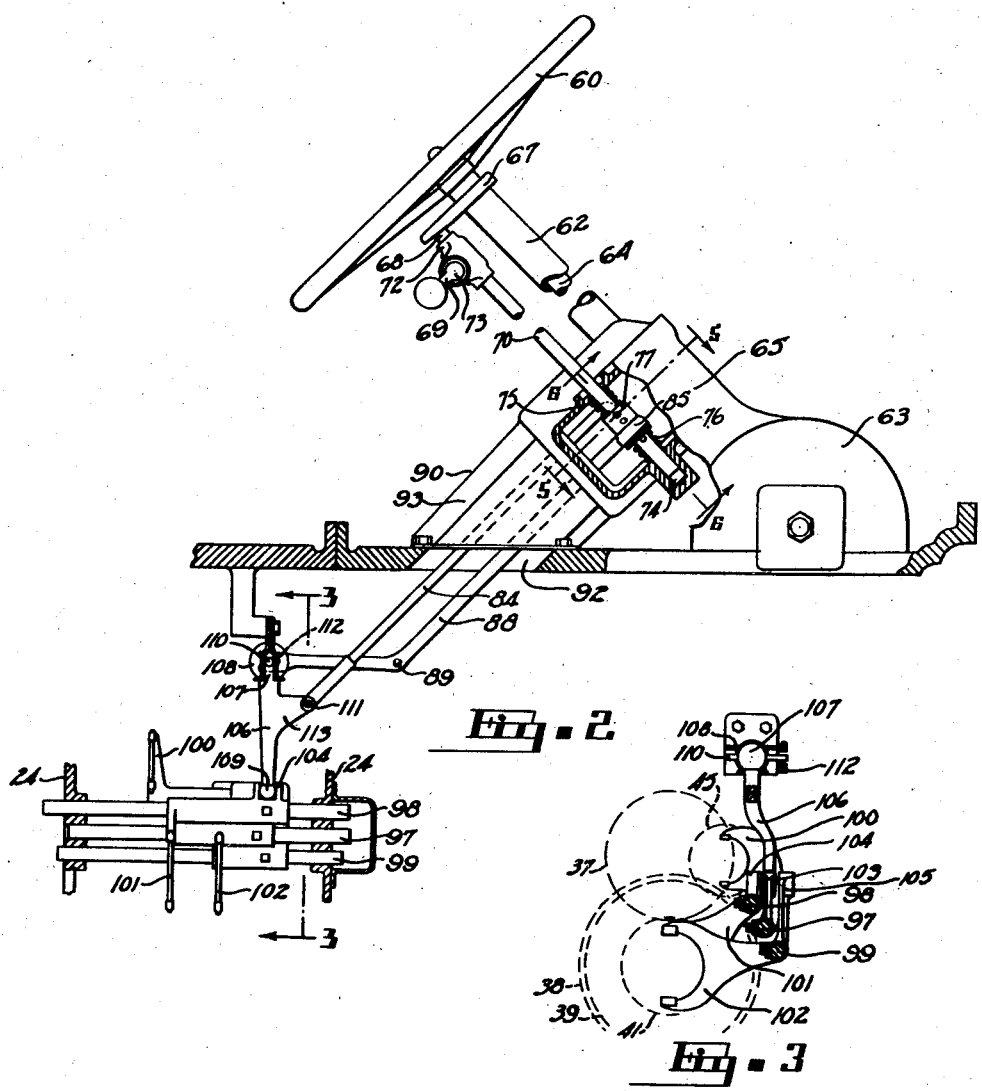

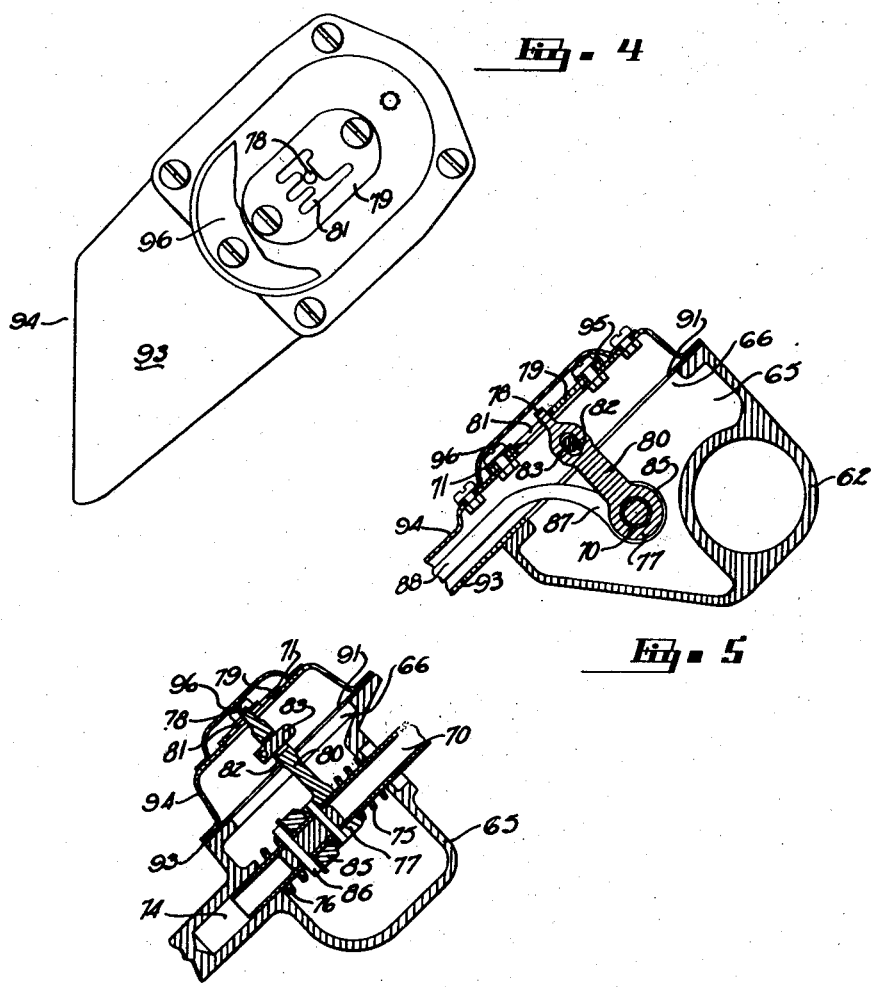

2,416,640

UNITED STATES PATENT OFFICE 2,416,640

TRACTOR TRANSMISSION CONTROL

Charles P. Pinardi, Dearborn, and Harold L. Brock, Detroit, Mich., assignors to Ford Motor Company, Dearborn, Mich., a corporation of Delaware Application January 18, 1945, Serial No. 573,452

10 Claims. (Cl. 74—484)

This invention relates to a transmission and control for automotive vehicles; and, more particularly, to a steering column gearshift control adapted for transmissions having four or more forward speeds.

One of the principal objects of this invention is to devise a steering column gearshift control adaptable for use on agricultural tractors and the like which will be adapted to the rigorous service required in such vehicles. Since most tractors are built around a tubular member which serves both as the frame and as the enclosure for the transmission, propeller shaft, differential and axle, the gearshift constructions which are adapted to passenger automobiles or trucks having a conventional frame and chassis, are not entirely suitable. Still another object is that, since the conventional three forward speeds used in passenger automobiles are insufficient to obtain maximum performance from a tractor, the control must be adaptable to the operation of transmissions having at least four forward speeds as well as a reverse. Because of the space restriction imposed by the relatively narrow tubular frame, the width of the control mechanism, including the scope of its necessary movement, must be held at a minimum throughout. Therefore, the conventional controls heretofore used which have laterally disposed bell cranks and similar apparatus are unavailable for tractor use. Another object of the invention is to provide a steering column gearshift to not only withstand the extremely hard service met with on agricultural tractors but which, in addition, will be readily accessible and so constructed as to be readily replaced or adjusted, should damage occur to it.

The advantage of the construction which is described herein is that it is, so far as the tubular body of the tractor is concerned, included within a minimum lateral scope consistent with operation of the transmission. A further advantage is that the components are completely adjustable from the outside of the tractor without having recourse to the inner portion of the tubular frame. Still another advantage is that one or more additional transmission speeds can readily be controlled without further complication of the control means.

With these and other objects in view, the invention consists in the arrangement, construction and combination of the various parts of the improved device, as described in the specification, claimed in the claims, and illustrated in the accompanying drawings in which:

Figure 1 is a longitudinal sectional elevation of a tractor employing the present invention.

Figure 2 is a similar elevation on an enlarged scale showing, particularly, the association between the transmission and the steering column gear-shift control.

Figure 3 is a transverse section as indicated by the line 3—3 on Figure 2, showing the relation of the transmission shift bars to the controlling mechanism.

Figure 4 is an elevation of the distant side of the pedestal as shown in Figure 2.

Figure 5 is a transverse section taken as indicated by the line 5—5 on Figure 2.

Figure 6 is a transverse section through the control rod taken as indicated by the line 6—6 on Figure 2.

Referring first to Figure 1, 10 indicates generally a tractor of the well-known "Ford" type having a motor 11 and a relatively narrow tubular frame 12 extending rearwardly therefrom and enclosing the transmission shown generally at 13, the differential 14, the main drive 15, the power take-off unit 16 and the hydraulic control 17.

Certain of the constructional details of this machine are described at length in the copending application for Power take-off drive unit, Serial Number 570,292, filed December 29, 1944, by H. L. Brock and C. P. Pinardi, and Power take-off drive for tractors, Serial Number 570,293, filed December 29, 1944, by H. L. Brock et al. It is sufficient for the purposes of this application to note that two independent drives are operated from the engine 11, one of which is represented by the take-off drive shaft 18, which is splined at its forward end directly to the crankshaft of the engine 11 and the other by the tube 19 which engages the engine 11 through the medium of the conventional clutch 20. The driving shaft 22 of the transmission 13 drivingly engages the rear end of the tube 19 and is itself tubular in form to permit the independent rotation of the power take-off drive shaft 18 which traverses it. Both the driving shaft 22 and the main driven shaft 23 are mounted in bearings in the webs 24 integrally formed with segments of the tubular frame 12. The driven shaft 23 terminates in a bevel pinion 25 mating with a bevel gear 26 which drives the differential cage 27. This, in turn, operates the drive pinions 28 mounted on the cross shaft 29 which drivingly engage the main drive gears 30 secured to the independent axles 32 mounting the wheels 33.

The requisite torque conversion is obtained in the transmission by the integrally formed pinions for first, second, third and fourth speeds which are designated as 34, 35, 36 and 37, respectively. These are selectively engaged by the corresponding gears indicated at 38, 39, 40 and 41. The first and second gears 38 and 39 are integrally formed on the hub 43, which is slidable on the splines of the driven shaft 23. The third speed is effected by engaging the hub 44, which is also slidable on the splines of driven shaft 23, with the gear 40 which is keyed to the shaft 23. The fourth speed is obtained by moving the hub 44 rearwardly to bring gear 41 into engagement with the pinion 37. A third shaft lying behind the drive shaft 22 is not visible, but it carries the reversing idler which is indicated in Figure 3 at 45 slidably mounted thereon and this may be engaged in the usual manner between the low-speed pinion and low-speed gear to effect reverse operation of the driven shaft 23.

A pump 46 is driven from the tube 19 through the gearing 47 to furnish operating fluid to the hydraulic control operating cylinder 48 (the piston not being shown) which in turn operates, through the shaft 49, the implement operating cross shaft 50. As is customary in this type of tractor, the operation of the hydraulic actuator is controlled by the spring resistance 52 which is attached, through suitable linkage not shown, to the draft implement.

The power-take-off unit 16 comprises a transverse shaft 53 drivingly connected with a belt pulley which is operated through the beveled gearing 54 and the clutch 55 by the take-off drive shaft 18. It also comprises a longitudinal take-off shaft 56 which is driven through the gearing 57 and the clutch 55 by the take-off drive shaft 18. Suitable shields 58 and 59 are provided as more fully described in the above-noted copending applications.

Reference is now made to the steering column assembly. This comprises a steering wheel 60 on the steering shaft 64 rotatably supported in the column 62 which terminates in an enlarged housing 63 at its lower end bolted to the frame 12 and enclosing a steering gear of the general type shown in United States Letters Patent 2,247,725. The steering shaft 64 is rotatably supported therein. The housing 63 also includes a substantially rectangular box section 65 shown in plan view at Figure 5 and in elevation at Figure 6 and having an opening 66 on the distant vertical side. An abutment 67 is secured adjacent the top of the column 62 mounting a pivot pin 68 serving as a fulcrum for the inner end of the gearshift lever 69 and as the upper guide for the gearshift control rod 70. This rod is fixedly secured to the sleeve 72 in which the lever 69 is rotatably mounted as by the ball joint 73 offset from the axis of rod 70. Thus, the rod 70 may be reciprocated upwardly or downwardly by similar movement of the lever 69 or rotated in response to rotation of the lever. This mechanism by means of which both rotary and vertical motion are imparted to control rod 70 by gear shift lever 69 is well known to those skilled in the art and is therefore not described in detail. This structure is described and claimed in a patent to J. J. Wharam, 2,317,654 issued April 27, 1943, on application Serial No. 383,318, filed March 3, 1941. The lower end of the rod 70 is slidably journaled in the recess 74 forming a downward extension of the box 65 and opposing springs 75 and 76 having a suitably varied rate and are provided to maintain the rod 70 and its associated lever 69 in a median or neutral position. The upper collar 77 is pinned to the rod 70 within the box 65 and is integrally formed with an arm 80 extending through the opening 66 (as is best seen in Figure 5), terminating in the finger 78 which is engaged in the slot 81 of the modified H plate 79. An elongated hole 82 is formed in the arm 80 and receives the cranked end 83 of the link 84 which, therefore, transmits the rotational movements of the rod 70. A lower collar 85 is loosely mounted on the rod 70, although its vertical movement is restricted by the upper collar 77, and the washer and pin 86 beneath. This lower collar is formed at the cranked end 87 of the link 88, which serves to translate the vertical reciprocations of the control rod 70. It will thus be apparent that vertical movement of the lever 69 is reflected in relative rotation of the link 88 about the pivot fulcrum 89 which is mounted on the tractor frame 12; and that rotational movement of the lever 69, relative to the column 62, is reflected in longitudinal reciprocation of the link 84.

Both links 84 and 88 are enclosed within a conduit 90 formed of two stampings of relatively light gage sheet metal extending obliquely from the box 65 to the tractor frame 12 and bolted about the opening 92 in the top thereof. The stamping 93 forming the near side of the conduit 90 in Figure 2 has an opening 91 corresponding to the opening 66 in the box section. The stamping 94 forming the distant side also has an opening 71 of somewhat smaller extent and over this is bolted the H plate 79 referred to above. The bolt holes 95 through which the H plate is attached to the stamping 94 permit some play to facilitate adjustment of the plate 79 and thereby to regulate the movement of the shifting mechanism as reflected in the path followed by the finger 78. A cover 96 is bolted over the H plate 79 as a further protection. It will be apparent that by removal of the cover 96 and the H plate 79, the entire lower portion of the steering column control is readily available for adjustment or repair.

Attention is now directed to the lower portion of Figure 2 in which the transmission control proper is shown. This comprises the three slide bars 97, 98 and 99 which carry the forks 100 operating the reverse gear, 101 operating the first and second gear, and 102 operating the third and fourth speed gear, respectively. The two latter forks engage the hubs 43 and 44 of the sliding gears on the driven shaft 23 in the usual manner, while the first fork operates similarly the reverse idler which is not shown in detail in these drawings. Each of these forks is provided with its respective notches 103, 104 and 105, which are aligned transversely of the tractor when in neutral position as indicated in Figure 3. An operating lever 106 has a ball head 107 universally mounted in the socket 108 secured to the tractor frame 12; and a small ball 109 at its foot adapted to be engaged selectively in the notches 103, 104 or 105 to operate the respective forks. A pin 110 traverses the ball head 107 and is engaged by the fork end 112 (shown in dotted line in Figure 2 and in section in Figure 3) of the link 88. An intermediate extension 113 on the lever 106 is pivotally connected with the end of the link 84 at 111.

The operation of the gear selector is believed to be quite clear. Starting at the neutral position shown, the operating lever 106 is in the intermediate or reverse notch 103 and rotation of the gearshift lever 69 in the proper sense will extend the link 84 pivoting the operating lever 106 about the ball head 107 and translating the fork 100 rearwardly to engage the reverse idler with the appropriate drive gears. Or, if it is desired to go into first speed, the gearshift lever 69 may be operated vertically, which will cause the link 88 to pivot about the fulcrum 89 and through the pin 110 tilt the operating lever 106 into engagement with the notch 104 and then rotation of the lever 69 will be reflected in extension of the link 84 pivoting the operating lever 106 and moving the fork 101 to effect the desired gear engagement. Corresponding routines are followed for each of the forward speeds. It will be recognized that suitable interlocking means must be operable between the various slide bars to prevent multiple operation of the forks and to restrict the shifting routine to that desired for normal operation. These may follow conventional practice as exemplified in the ordinary types of transmissions.

The construction is completed, as shown in Figure 1, by a stamped cowl 115, which also serves as an instrument panel and as the upper support for the steering column and control rod. This extends forwardly at 116 as the fuel tank and engine hood and downwardly at 117 to enclose the steering column. An opening 118 is provided around the housing 63, though this is covered in by the relatively narrow hood 119. The lateral compactness of the device may be judged from the thickness of the conduit required, as shown in Figure 5; and it will be apparent that the lateral amplitude of movement of the various parts is maintained at a minimum, as will be seen in Figure 3. Thus, the device is particularly applicable for use on tractors where space is limited, as opposed to current automotive practice in which substantially the entire distance between the sills of the frame is available for installation and operation. Another advantage of the present embodiment is that the operating mechanism, while fully protected, is readily available and is not enclosed in the tubular frame of the tractor, which is comparable to the construction used in automotive work. It will further be noted that only a single control tube is required to obtain the five positions of active transmission engagement required in the present embodiment and that by increasing the amplitude of travel of the link 88 and correspondingly increasing the number of notches and forks, an even larger number of selective positions may be obtained with the same basic apparatus. Thus the device is most valuable for use in heavy-duty equipment in which graduated torque control is essential.

Some changes may be made in the apparatus described, without departing from the spirit of the invention, and it is the intention to cover by the claims such changes as may reasonably be included within the scope thereof.

The invention claimed is:

1. In a tractor transmission control, a tractor frame, a steering column rigidly secured to said frame, a housing associated with said steering column, a gearshift rod extending along said column and being slidably and rotatably supported thereon, means at the upper end thereof to reciprocate and to rotate said rod, means normally maintaining said rod to a median position corresponding to neutral position of the tractor transmission, an extension secured adjacent the lower end of said rod to be reciprocated thereby on rotation of said rod, a second extension rotatably mounted on said rod adjacent said first extension, a fulcrum about which said second extension is rotatable on reciprocation of said rod, a transmission operating lever suspended by a joint for universal movement and having its lower end selectively engaging one of a plurality of transmission operating forks, said second extension engaging said operating lever adjacent said joint to rotate said operating lever transversely into selective engagement with said forks, said first extension engaging said operating lever at a point distant from said joint to move said operating lever longitudinally to actuate the fork so selected.

2. In a tractor transmission control, a tractor frame, a steering column rigidly secured to said frame, a housing associated with said steering column, a gearshift rod extending along said column and being slidably and rotatably supported thereon, means at the upper end thereof to reciprocate and to rotate said rod, resilient means normally urging said rod to a median position corresponding to neutral position of the tractor transmission, an extension secured adjacent the lower end of said rod to be reciprocated thereby on rotation of said rod, a second extension rotatably mounted on said rod adjacent said first extension, a fulcrum about which said second extension is rotatable on reciprocation of said rod, a transmission operating lever suspended by a ball joint for universal movement and having its lower end selectively engaging one of a plurality of transmission operating forks, said second extension engaging said operating lever adjacent said ball joint to rotate said operating lever transversely into selective engagement with said forks, said first extension engaging said operating lever at a point distant from said ball joint to rotate said operating lever longitudinally to actuate the fork so selected, an H plate, and a finger formed on one of said extensions engaging the opening in said H' plate to limit the operation of said extension.

3. In a tractor transmission control, a tractor frame, a steering column rigidly secured to said frame, a housing associated with said steering column, a gearshift rod extending along said column and being slidably and rotatably supported thereon, means at the upper end thereof to reciprocate and to rotate said rod, resilient means normally urging said rod to a median position corresponding to neutral position of the tractor transmission, an extension secured adjacent the lower end of said rod to be reciprocated thereby on rotation of said rod, a second extension rotatably mounted on said rod adjacent said first extension, a fulcrum about which said second extension is rotatable on reciprocation of said rod, a transmission operating lever suspended by a ball joint for universal movement and having its lower end selectively engaging one of a plurality of transmission operating forks, two of said forks controlling the forward speeds of said transmission and the third said fork controlling a reverse speed of said transmission, said second extension engaging said operating lever adjacent said ball joint to rotate said operating lever transversely into selective engagement with said forks, said first extension engaging said operating lever at a point distant from said ball joint to rotate said operating lever longitudinally to actuate the fork so selected, and regulating means adjacent the lower portion of said rod to restrict the operation thereof to desired successive positions of engagement.

4. In a tractor transmission control, a tractor frame, a steering column rigidly secured to said frame, a housing associated with said steering column spaced above said frame, a gearshift rod extending along said column and being slidably and rotatably supported thereon, means at the upper end thereof to reciprocate and to rotate said rod, resilient means normally urging said rod to a median position corresponding to neutral position of the tractor transmission, an extension secured adjacent the lower end of said rod to be reciprocated thereby on rotation of said rod, a second extension rotatably mounted on said rod adjacent said first extension, a fulcrum about which said second extension is rotatable on reciprocation of said rod, a transmission operating lever suspended by a ball joint for universal movement and having its lower end selectively engaging one of a plurality of transmission operating forks, a pin extending transversely from said ball joint, said second extension terminating in a fork engaging said pin eccentrically with respect to said ball joint to rotate said operating lever transversely into selective engagement with said forks, said first extension engaging said operating lever at a point distant from said ball joint to rotate said operating lever longitudinally to actuate the fork so selected, two of said forks operating the forward speed gears of said transmission and a third fork operating a reverse speed gear of said transmission.

5. In a tractor transmission control, a tractor frame, a steering column rigidly secured to said frame, a housing associated with said steering column above said frame, a gearshift rod extending along said column and being slidably and rotatably supported thereon, means at the upper end thereof to reciprocate and to rotate said rod with respect to said steering column, resilient means normally urging said rod to a median position corresponding to the neutral position of the tractor transmission, an extension secured adjacent the lower end of said rod to be reciprocated thereby on rotation of said rod, a second extension rotatably mounted on said rod adjacent said first extension, said extensions being in substantially vertical alignment and leading from said housing to the interior of said tractor frame, a conduit enclosing said extensions between said housing and the interior of said tractor frame, said conduit including an H plate adjacent to said housing, a finger on one said extension engaging the slot in said H plate to restrict the routine of movement of said rod, a fulcrum on said tractor frame about which said second extension is rotatable on reciprocation of said rod, a transmission operating lever suspended from a connection on said frame permitting universal movement thereof and having its lower end selectively engaging one of a plurality of transmission operating forks, said second extension engaging said operating lever eccentrically adjacent said connection to rotate said operating lever transversely into selective engagement with said forks, said first extension engaging said opperating lever at a point distant from said joint to rotate said operating lever longitudinally to actuate the fork so selected, the forks of said transmission engaged by said operating lever at the extreme positions of said rod controlling the forward speeds of said transmission and the fork engaged by said operating lever when adjacent the median position controlling a reverse speed of said transmission.

6. In a tractor transmission control, a substantially tubular tractor frame, a steering column rigidly secured to said frame, a housing associated with said steering column above said tractor frame, a gearshift rod extending along said column and being slidably and rotatably supported thereon with respect thereto, means at the upper end thereof to reciprocate and to rotate said rod, resilient means within said housing normally urging said rod to a median position corresponding to neutral position of the tractor transmission, a collar rigidly secured to said rod adjacent at the bottom thereof and extending from said housing, a second collar rotatably supported on said rod adapted to be reciprocated therewith, a conduit associated with said housing and extending therefrom to said tractor frame, a link within said conduit engaging said extension, a second link within said conduit rigidly connected with said second collar, a fulcrum on said tractor frame for said second link whereby reciprocation of said rod provides limited rotation of said link, both of said links being in substantially the same vertical plane, a transmission operating lever suspended from said tractor frame, said second link engaging said operating lever eccentrically laterally to impart transverse movement thereto, said first link engaging said operating lever eccentrically vertically to impart longitudinal movement thereto, said operating lever engaging one of a plurality of transmission control forks mounted on vertically staggered transmission slide bars, said operating lever with said rod in its extreme position engaging the forks controlling the forward speeds of said transmission and when said rod is adjacent the median position engaging the fork controlling a reverse speed of said transmission.

7. In a tractor transmission control, a substantially tubular tractor frame, a steering column rigidly secured to said frame, a housing associated with said steering column above said frame, a chamber in said housing closed with respect to said steering column, a gearshift rod extending along said column and being slidably and rotatably supported thereon and terminating within said chamber, means at the upper end of said rod to reciprocate and to rotate said rod with respect to said steering column, means within said chamber normally maintaining said rod at a median position corresponding to neutral position of the tractor transmission, a collar rigidly secured to said rod adjacent the lower end thereof and having an extension projecting laterally from said chamber, a finger at the end of said extension, a conduit affixed to one side of said chamber and leading to the top of said tractor frame, an H plate forming a part of said conduit and adapted to engage the finger on said extension, a slot formed in said extension, a link engaged in said slot and leading to said conduit through the interior of said tractor frame, a second collar rotatably supported on said rod but secured for reciprocation therewith having a link formed integrally therewith and extending from said chamber through said conduit to the interior of said tractor frame, a tractor transmission within said frame, a transmission operating lever universally suspended from said tractor frame, said first link engaging said operating lever eccentrically vertically of said universal joint to impart longitudinal movement to the lower end of said operating lever, said second link engaging said operating lever eccentrically laterally of said universal joint to impart transverse movement to said operating lever on reciprocation of said rod, a plurality of vertically staggered slide bars in said transmission, transmission operating forks